United States Patent Office 3,477,858
Patented Nov. 11, 1969

3,477,858
PROCESS FOR COATING NUTS
Phillip R. Wells, Somerville, and Daniel Melnick, West Englewood, N.J., assignors to Corn Products Company, New York, N.Y., a corporation of Delaware
No Drawing. Filed Sept. 12, 1966, Ser. No. 578,487
Int. Cl. A23b 9/00
U.S. Cl. 99—126         11 Claims

ABSTRACT OF THE DISCLOSURE

This application discloses a nut product which comprises a nut meat containing a coating comprising a blend of mannitol and sorbitol.

---

This invention relates to a process for treating nut meats, such as shelled peanuts, in order to make them exceptionally palatable, attractive in appearance, and stable against deterioration.

Within recent years there has been an increased interest in dry-roasted nuts such as peanuts. Some of the advantages of dry, air-roasted nuts are a dry, rather than an oily surface; crisp texture; and long storage life.

One of the disadvantages of dry-roasted nuts is the lack of distinctive true nut flavor. Certain spice blends have been developed to impart desired flavors, and these have been applied to the nuts in coatings of various types. These coatings have been starch-based or gum-based and have a major disadvantage of their own in that they flake off. The flakes collect as unsightly "fines" in the bottom of any container in which the coated nuts are stored.

To avoid flaking and other problems inherent in starch-based and gum-based coatings, it has been proposed to coat nuts and nut products with a variety of other non-oily materials. Two of the most desirable are sorbitol or mannitol. When either of these materials is used, the use of oil as a roasting medium is avoided, either by roasting the nuts in a molten bath of sorbitol or mannitol, or by roasting first in air and subsequently coating the roasted nuts with sorbitol or mannitol. A coating of either sorbitol or mannitol will not "flake," and will carry flavorings.

Unfortunately, there are certain disadvantages to, and problems in, the use of each of these materials as a coating for nuts.

If one roasts nut meats such as peanuts in a molten bath of sorbitol, or first roasts the nuts in air and then dips them in the molten sorbitol, and subsequently attempts to coat the nuts with an outer layer of salt, the following problems are encountered:

(1) The sorbitol remains sticky, or tacky, for a long period of time (at least 18 hours) even after it has reached room temperature. The nuts therefore adhere to each other during the salt coating operation. Furthermore, after the sorbitol coating has ceased to be tacky, it still remains soft, or "plastic," for about 24 hours.

(2) Sorbitol coated nuts have a tendency to become sticky if exposed to conditions of high humidity for any length of time, probably because of the hygroscopic nature of the sorbitol.

If, on the other hand, the above process is repeated using mannitol in place of sorbitol, the following problems are encountered:

(1) Because of the high melting point of mannitol (in excess of 330° F.), high processing and handling temperatures must be used. Also, at these high temperatures the nuts will roast very quickly; therefore the roasting time becomes critical and the process is very difficult to control.

(2) The mannitol solidifies immediately upon cooling and becomes hard and brittle very quickly after the nuts have been removed from the molten bath. This results in poor draining of the excess mannitol, and more seriously, in agglomeration of the nuts, and difficulties in obtaining a satisfactory outer coating with spices and salt. It is difficult to apply and to distribute salt and/or spices, before the mannitol solidifies. Moreover, the surface of the coated nuts tends to be rough with spots of solidified mannitol.

(3) Another problem encountered is the unavoidable deposition of solidified mannitol throughout the equipment, because of the small difference between the melting point of the mannitol and the processing temperature.

Although the flavor of nuts coated with either sorbitol or mannitol is very good, the texture of nuts coated with sorbitol is somewhat soft. Mannitol coatings, on the other hand, are generally non-uniform, non-adherent, and rather brittle.

It is an object of this invention to provide a new, practical process for dry roasting and coating nuts.

Another object of the invention is to provide a new, practical process for dry roasting and coating nuts with an enrobing coating that is non-flaking and that can be used for applying salt, spices, coloring materials, or the like to the nuts.

It is a further object of the invention to provide nut products with flavor, texture and appearance superior to any heretofore known to the art.

Still another object of the invention is to provide nut products having exceptional stability against rancidity and deterioration of flavor and texture.

Other objects and advantages will appear hereinafter from the specification and from the recitals of the appended claims.

We have discovered a process for treating nut meats whereby all of the above-enumerated problems are eliminated. Furthermore, we have discovered a process for preparing nut meats which have an exceptionally delicious taste and excellent texture and appearance. The process of our invention is applicable to nut meats in any form, i.e. whole (shelled) nuts, coarsely chopped or thinly sliced nuts, nut pieces, and the like. The nuts so treated are delicious when eaten alone as "snacks," and can also be added to other foodstuffs such as ice cream and baked products.

Fundamentally, our process comprises coating nut meats with a combination of from about 90% to about 50% by weight of mannitol and from about 10% to about 50% by weight of sorbitol. Preferably, the coating composition is in the form of a molten bath which is maintained at a temperature of about 300° F. or higher (preferably about 325° F.), although an aqueous solution can be used. If an aqueous solution is used the nuts can be dipped into the solution or the solution can be sprayed onto the nuts, after which the excess moisture is removed as by drying.

The preferred ratios of ingredients in the coating composition is about 65% to 75% mannitol to about 35% to 25% sorbitol, by weight. A combination of 70% mannitol and 30% sorbitol by weight is a preferred example within these ranges.

When treating nuts which are not customarily roasted, e.g. English walnuts, the nuts are merely quickly dipped in the bath, or sprayed with the molten mixture.

If the nuts are to be roasted, they can be first air roasted and subsequently dipped or sprayed or they may be roasted directly in the bath. The time required for roasting in the bath will of course depend upon the particular nuts being used, the temperature of the bath, and the desired degree of roast. If peanuts are used, between 5 and 15 minutes at 325° F. will suffice, depending upon the moisture content of the peanuts and the degree of roast wanted.

After the coating or roasting and coating operation, the nuts can be drained, the coating permitted to harden for a few minutes, and the product packaged. The mannitol-sorbitol coating alone gives to the nuts an excellent flavor and crisp texture, and renders them extremely stable against flavor deterioration and rancidity.

However, another aspect of our invention comprises a process for further coating the nuts with an outer layer of salt and other materials which give them an exceptionally fine flavor, texture, color and appearance, in addition to remarkably good stability against rancidity.

After roasting, the nuts are removed from the molten bath and drained. The mannitol-sorbitol combination drains quickly and smoothly, but does not harden as rapidly as does mannitol alone. Immediately after draining, while the mannitol-sorbitol coating is still hot and tacky, the nuts are placed in an agitated vessel, preferably one with a tumbling action, salt, preferably mixed with spices or coloring materials is added, and the mixture agitated until the coating is no longer tacky. Once this point has been reached, the nuts are cooled or allowed to cool to approximately room temperature and then are ready for packaging.

Surprisingly, the mannitol-sorbitol combination provides a superior coating than is possible with either mannitol or sorbitol alone. Mannitol and sorbitol in a ratio of 25 parts to 75 parts forms a eutectic mixture with a melting point of 186° F., whereas sorbitol alone has a melting point of 206° F. and mannitol alone has a melting point of 331° F. Thus, one would expect the mannitol in our mixtures, which range in mannitol concentration from 50 to 90% of the total, to solidify first at the beginning of the cooling stage and this to be followed by the eutectic mixture finally solidifying. Thus, our coatings could be expected to be even more objectionable than the pure sorbitol itself.

It should be noted that the mannitol-sorbitol combination makes an excellent "binder" for the condiments and the colored salt. It remains tacky for a sufficient period of time to insure even distribution of the condiments but is not so sticky as to cause the nuts to adhere to each other during the operation of applying the condiments. Surprisingly, the discrete particles of colored salt-spice mixture after application to the nuts are not found as discrete colored salt particles embedded in the congealed coating. Instead the entire coating appears uniform in color even though the salt and the spice colorings individually and collectively are insoluble in the coating material.

In continuous operation it is preferable to use well insulated processing equipment and well insulated cells for the overnight storage of the hot processing medium. Prior to such storage it is desirable to filter and decolorize the molten mannitol-sorbitol mixture with any of the usual adsorbents (bleaching earth, charcoal, etc.).

The following examples will illustrate one preferred mode of practicing our invention. It will be readily apparent that many variations, which are within the scope of the invention, are possible. The examples should not, therefore, be considered as limiting the invention in any way.

Example I 49 pounds of mannitol and 21 lbs. of sorbitol were place in a heated, thermostatically regulated vessel and heated to 325° F., at which temperature the ingredients were completely melted.

Five pounds of blanched (skins removed) peanuts were placed in a cylindrical wire mesh basket, the basket was closed at both ends, and the nuts were pre-heated in air at 250°–275° F. for about 15 minutes. The reason for the pre-heating step was to avoid a sudden temperature drop of the molten mannitol-sorbitol mixture upon addition of the peanuts and thereby avoid clumping of the nuts as a result of localized cooling and solidification of the roasting medium. The basket containing the preheated nuts was then partially immersed in the molten mannitol-sorbitol bath at 325° F., and rotated to assure continuous contact of the peanuts with the hot, molten medium. After about 10 minutes the peanuts were completely roasted.

The basket was then removed from the bath and the excess mannitol-sorbitol was allowed to drain from the nuts for about one minute. Immediately after draining, while the peanuts were still hot and before the coating had begun to solidify, the peanuts were transferred to a second basket. This basket was open at one end and was so arranged that it could be rotated at about a 45° angle, thus tumbling and mixing the nuts. Salt colored by a coating of oleoresin of paprika (0.5% based on the weight of the salt) plus an admixture of powdered turmeric (2.5% based on the weight of the salt) was added while the nuts were tumbling and before the coating of mannitol-sorbitol had solidified. The colored salt amounted to 1.5% of the final peanut product. Tumbling was continued for 3–5 minutes until the salt and spices were evenly distributed and the peanuts and the coating had solidified to the point where the peanuts no longer stuck to one another. Tumbling was stopped and the nuts were allowed to cool statically for about 20–30 minutes to room temperature.

The nuts had an excellent appearance; the mannitol-sorbitol coating was very smooth and even, and the salt-spice outer layer was exceptionally uniform in color. The nuts had a delicious flavor and a very fine crisp texture. After shelf-aging for three months in contact with air no rancidity had developed and no deterioration in either flavor or texture had occurred. Furthermore, both the basic mannitol-sorbitol coating and the outer salt-spice layer showed extremely good adherence; even after rough handling no "flaking" occurred. It has been noted that the coatings of the so-called "dry roasted" nuts which are presently on the market flake excessively, resulting in both waste and poor appearance.

Example II

Example I was repeated except a mixture of 42 lbs. of mannitol and 28 lbs. of sorbitol was used, the mixture was heated to about 300° to 310° F., and the peanuts were immersed in the molten bath for about 15 minutes.

The resultant products were similar in taste, texture, appearance and storage stability to those of Example I.

Example III

Example I was repeated except a mixture of 56 lbs. of mannitol and 14 lbs. of sorbitol was used, the mixture was heated to about 330° F., and the peanuts were immersed in the molten bath for about five minutes. The resultant products were similar to those of Example I.

Example IV

Example I was repeated except the salt and spices used in that example were replaced with salt which had been colored with a solution of yellow and orange food colors (Pyla-Cert canary yellow and Pyla-Cert natural orange), in the amount of about 0.1% by weight yellow and about 0.05% by weight orange, based on the weight of the salt.

The nuts had an excellent flavor and attractive appearance. They did not show the excellent stability against rancidity of the nuts coated with spices, since rancidity began to develop at about six weeks in contact with air, indicating that packing in the absence of oxygen, e.g. under vacuum, would be recommended for these products. The spices in the salt of Examples I–III appear in the present application to act like antioxidants in protecting the roasted nuts against rancidity development.

Example V

Example I was repeated except five pounds of cashew nuts were roasted for four minutes. The salt used was coated with 3% oleoresin of paprika and mixed with 5% tumeric before addition to the nuts as described in Example I. The finished product contained 0.4% salt and had an exceptionally fine cashew flavor and attractive appearance.

Example VI

Example I was repeated except that five pounds of almonds were roasted for six to ten minutes. In this case the salt used had been coated with 3% olearesin of paprika and blended with 10% tumeric. The nuts contained 0.5% salt, and had an exceptional roasted almond flavor and an attractive deep golden roasted color.

Example VII

Five pounds of pecan halves were pre-heated at 325° F. for three minutes. They were then roasted for 30 seconds in a blend of 49 lbs. of mannitol, plus 21 lbs. of sorbitol at a temperature of 350° F. The salt used was coated with 3% oleoresin of paprika and mixed with 20% tumeric. The finished nuts contained 0.5% salt and had an attractive appearance and a flavor reminiscent of pecan candy.

Of course, many variations of the process are possible. The nuts need not be roasted in the mannitol-sorbitol bath; they can be merely dipped in the molten bath, or dipped in an aqueous solution of mannitol and sorbitol or sprayed with such a solution and then dried. Heat stable coloring materials can be dissolved in the bath or solution of mannitol and sorbitol instead of being added to the mannitol-sorbitol coating. The salt and/or spices can be eliminated entirely, or replaced with other materials. Additional seasonings or the like can also be added.

We prefer to use the particular spices set forth in Examples I through III, and V through VII, i.e. tumeric and oleoresin of paprika because they not only give to the nuts a very attractive and uniform color (golden brown) but also greatly enhance their stability against rancidity and flavor deterioration, as was noted above. Of course, other coloring materials, e.g. caramel color or artificial food colors, can be used in place of or in addition to the spices.

Although not critical, we have found that a finely ground salt gives the best appearance. Furthermore, addition of an antioxidant to the salt may be helpful in order to preserve the color of the spices, if the spices are the sole coloring material used.

Although our examples show the treatment of whole nuts in accordance with the invention, the process is equally applicable to any nut meats, either whole or in discrete pieces (e.g. broken, coarsely chopped, sliced or the like).

When a molten bath of mannitol and sorbitol is used the temperature of the bath is not critical, except, obviously, it must be sufficiently high to melt the mannitol-sorbitol combination and must not exceed the decomposition temperature of the mannitol. A temperature of about 300 to 325° F. is recommended as being the most practical. The time of immersion in the bath depends, of course, on whether or not the nuts are to be roasted in the bath, and, if they are to be roasted, upon the type and quality of nuts being treated, the temperature of the bath, and the degree of roasting desired.

We claim:

1. A process of preparing a comestible coated nut product which comprises coating a nut meat with a molten combination of from about 90% to about 50% of mannitol by weight, and from about 10% to about 50% of sorbitol by weight, based on the weight of the coating and subsequently permitting excess mannitol-sorbitol to drain therefrom.

2. The process of claim 1 wherein said nut meat is roasted in air prior to coating it with said combination of mannitol and sorbitol.

3. The process of claim 1 wherein said coating is a combination of from about 75% to about 65% of mannitol by weight and from about 25% to about 35% of sorbitol by weight, based on the weight of the coating.

4. The process of claim 1 wherein said nut meat is coated by immersing the nut meat into a molten bath of said combination.

5. The process of claim 4 wherein said nut meat is roasted in air prior to immersing it into said molten bath of mannitol and sorbitol.

6. The process of claim 4 including the additional step of contacting the coated drained nut meat, while the coating is still hot, wtih salt, and agitating said coated nut meat with said salt until said coating was hardened, whereby a uniformly dispersed outer layer of the salt on the coated nut meat is obtained.

7. The process of claim 6 wherein said coated, drained nut meat is contacted and agitated with, in addition to said salt, a member selected from the group consisting of spices, edible food colors and mixtures thereof.

8. The process of claim 4 wherein said nut meat is retained in said bath for a time sufficient to roast said nut meat.

9. A process for preparing a comestible nut product comprising the following steps:
 (a) immersing an unroasted nut meat into a molten bath comprising from about 90% to about 50% by weight of mannitol and from about 10% to about 50% by weight of sorbitol;
 (b) keeping said nut meat immersed in said molten bath for a time sufficient to roast said nut meat to the desired degree;
 (c) removing said nut meat from said bath and permitting the excess mannitol-sorbitol combination to drain therefrom;
 (d) immediately thereafter contacting the resultant coated nut meat with a mixture of salt and a member selected from the group consisting of spices, edible food colors, and mixtures thereof; and
 (e) agitating the resultant mixture until the mannitol-sorbitol coating has hardened.

10. The process of claim 9:
 (a) wherein said nut meat is a peanut;
 (b) wherein said molten bath comprises a combination of about 70% by weight of mannitol and about 30% by weight of sorbitol;
 (c) wherein said peanut is immersed in said molten bath for a time of from about 5 to about 15 minutes; and
 (d) wherein, after the excess mannitol-sorbitol combination has been drained from the coated peanut, said peanut is contacted and agitated with a mixture of salt, oleoresin of paprika and tumeric.

11. The process of claim 10 wherein said salt is finely ground and wherein said salt contains an antioxidant.

References Cited
UNITED STATES PATENTS 2,859,121  11/1958  Avera _____ 99—126

RAYMOND N. JONES, Primary Examiner

R. M. ELLIOTT, Assistant Examiner

U.S. Cl. X.R.

99—127